(12) United States Patent
Keshner et al.

(10) Patent No.: US 9,924,640 B1
(45) Date of Patent: Mar. 27, 2018

(54) MODIFYING SUNLIGHT SCATTER IN THE UPPER ATMOSPHERE

(71) Applicants: Marvin S Keshner, Sonora, CA (US); Erik Garth Vaaler, Redwood City, CA (US)

(72) Inventors: Marvin S Keshner, Sonora, CA (US); Erik Garth Vaaler, Redwood City, CA (US)

( * ) Notice: Subject to any disclaimer, the term of this patent is extended or adjusted under 35 U.S.C. 154(b) by 0 days.

(21) Appl. No.: 15/410,954

(22) Filed: Jan. 20, 2017

(51) Int. Cl.
*G02B 5/00* (2006.01)
*A01G 15/00* (2006.01)

(52) U.S. Cl.
CPC .................................. *A01G 15/00* (2013.01)

(58) Field of Classification Search
CPC .......................................................... A01G 15/00
USPC ........................................ 250/505.1; 252/588
See application file for complete search history.

(56) References Cited

U.S. PATENT DOCUMENTS

| | | | |
|---|---|---|---|
| 5,003,186 A | 3/1991 | Chang | |
| 2007/0069189 A1* | 3/2007 | Miyata | A61K 8/25 252/588 |
| 2009/0116753 A1* | 5/2009 | Midgley | G06Q 30/06 382/219 |
| 2010/0071902 A1* | 3/2010 | Ziegler | B02C 19/066 166/280.2 |
| 2011/0013271 A1* | 1/2011 | Kawai | A01G 15/00 359/350 |
| 2012/0241554 A1* | 9/2012 | Davidson | A01G 15/00 244/30 |
| 2016/0158726 A1* | 6/2016 | Watanabe | C01B 21/0823 422/111 |

OTHER PUBLICATIONS

Maruyama et al., Possibility for Controlling Global Warming by Launching Nanoparticles Into the Stratosphere, 2015, Journal of Thermal Science and Technology, vol. 10, No. 2, pp. 1-18.*
Hovis, Infrared Spectral Reflectance of Some Common Minerals, Feb. 1966, Applied Optics, vol. 5, No. 2, pp. 245-248.*
Cox, Ask the Captain: How High Can a Plane Fly?, Feb. 2014, USA Today.*
Otterman, Earth-Atmosphere System and Surface Reflectivities in Arid Regions From Landsat Multispectral Scanner Measurements, Jun. 1976, Goddard Space Flight Center, p. 10.*
Hamill, P; "The Life Cycle of Stratospheric Aerosol Particles", Bulletin of the American Meteorological Society, vol. 78, No. 7, Jul. 1997.
Rotman, D; "A Cheap and Easy Plan to Stop Global Warming", MIT Technology Review, Feb. 8, 2013.

* cited by examiner

*Primary Examiner* — Jason McCormack
(74) *Attorney, Agent, or Firm* — Shalini Venkatesh

(57) ABSTRACT

A method of lowering the temperature of the Earth comprises placing particles of sand into the upper atmosphere, wherein the particles are selected on the basis of size and refractive index such that the particles will scatter and reflect incoming sunlight having a wavelength in the near-IR back into space. The average diameter of the particles may be selected based on the index of refraction and the Mie scattering intensity for dielectric particles, to maximize the amount of light scattered at wavelengths between 0.8 μm and 2 μm. The average diameter of the particles may be selected based on the index of refraction and the Mie scattering intensity for dielectric particles, to minimize the amount of light scattered at wavelengths between 5 μm and 20 μm.

12 Claims, 3 Drawing Sheets

MODIFYING SUNLIGHT SCATTER IN THE UPPER ATMOSPHERE

FIELD OF INVENTION

This invention relates in general to methods of reducing global warming, and more specifically to doing so by increasing the effective reflectivity of the upper atmosphere to reduce the amount of sunlight reaching the Earth's surface, while allowing far IR radiation emitted by the Earth to pass through into space.

BACKGROUND

Global warming is caused by greenhouse gases in the lower atmosphere. The Earth is warmed by absorbing sunlight and cooled by emitting blackbody radiation in the far infrared (IR) out into space. The greenhouse gases reduce the amount of IR radiation leaving the Earth. Hence, the Earth warms more in the presence of greenhouse gases, emitting more IR radiation, until the amount of IR radiation leaving the Earth is again in balance with the amount of sunlight energy arriving.

Most attempts to reduce global warming focus on reducing the amounts of the greenhouse gases ($CO_2$, Methane, etc) in the lower atmosphere back to levels seen before 2005 or even back to levels seen in 1950. Unfortunately, even if we were to stop burning fossil fuels now and greatly reduce the amount of $CO_2$ entering the atmosphere, the high level that is already there would last for something like 1000 years.

Therefore, alternate approaches, collectively called geo-engineering, have been proposed, in which something is introduced into the atmosphere to counteract the effects of the greenhouse gases. In one of these, a sulfate-based aerosol, made up of water droplets containing sulfuric acid, is introduced into the upper atmosphere, where the droplets will scatter sunlight and reflect some of the sunlight back into space. Since the total amount of sunlight that would reach the Earth is diminished, the Earth will cool, even through the $CO_2$ is still trapping some of the IR radiation produced at the Earth's surface from leaving the Earth.

Unfortunately, placing huge quantities of sulfate-based aerosols into the upper atmosphere is highly controversial for several reasons. First, the sulfates will come down from the upper atmosphere in the form of acid rain. Acid rain is well known to have detrimental effects on trees, food crops and other plant life. Second, the droplets formed by adding sulfates to water are very small, in the range of 0.01-0.25 μm, with most around 0.05 μm. Particles of this size scatter short wavelength visible light more effectively than other parts of the sunlight spectrum. Both red and blue wavelengths of light are required by plants for photosynthesis. Scattering more of either red or blue could slow the growth of plants. It could adversely affect food production and slow the rate at which trees and other plants consume $CO_2$. Finally, the time for which the $SO_2$ water droplets will remain in the upper atmosphere is not known. There is a tendency for them to bump into each other and agglomerate. When big enough, they will fall more quickly down to Earth. If their lifetime in the upper atmosphere is too short, then more $SO_2$ will be required to replace them and more acid rain will be created.

In another geo-engineering approach, it has been suggested that particles composed of metal oxides, like $Al_2O_3$, be introduced into the top of the lower atmosphere, from 7-13 km above the Earth, where the $CO_2$ in the atmosphere tends to accumulate. These particles have much larger diameters ranging from 5 μm-10 μm.

A part of this approach is for these metal oxide particles to absorb the near IR (0.9 μm-2 μm) and re-radiate it back out into space. By doing so, about 30% of the energy in sunlight would not reach the surface of the Earth, causing the Earth to cool. Unfortunately, metal oxide particles, such as $Al_2O_3$ or Thorium Oxide particles that have been suggested for this approach, are quite transparent in the near IR and would not absorb much sunlight in this range of wavelengths. Since they absorb 10 μm wavelengths very well, they act like $CO_2$, Methane and other greenhouse gases. They will reflect the black body radiation near 10 μm back to Earth and result in warming the Earth.

Another part of this approach is to use the Weisbach effect, where a material like $Al_2O_3$ absorbs energy at a wavelength of 10 μm and re-radiates it out as visible light. Gas lantern mantles use this effect to absorb the heat from burning gas and radiate a bright, white light. As Welsbach materials, $Al_2O_3$ or Thorium Oxide could absorb the 10 μm, black body radiation and re-radiate it as visible or ultraviolet light. As visible light, this energy would not be stopped by the $CO_2$ and other greenhouse gases.

However, for this approach to be effective, these particles would have to be positioned within or below the $CO_2$ layer. The black body energy from the Earth would have to hit these particles before it hit the $CO_2$ layer. This would require that the particles are dispersed in the lower atmosphere at about 7 km, and certainly below 10 km. Unfortunately, in the lower atmosphere, particles in the air are quickly washed out of the air by rain. Particles with diameters in the range of 5 μm-10 μm fall out very quickly. Moreover, the cost of this approach would be high. One would have to mine relative pure $Al_2O_3$ or other metal oxides, and grind them into particles of the desired size.

Finally, people have also proposed introducing more water vapor into the upper atmosphere. Unfortunately, the water vapor tends to agglomerate readily to form large particles (ice crystals) of water. These ice crystals are commonly seen in the high Cirrus clouds that form in the upper part of the lower atmosphere. Water vapor and ice crystals are among the strongest greenhouse gases. While they might be effective in reflecting some sunlight back into space, their net effect is to reflect more heat back to the Earth.

There is, therefore, a need to identify and provide a different material from those previously considered, that could be positioned in the upper atmosphere to more efficiently provide the increased albedo effect desirous for reducing global warming, without incurring the risk of acid rain, negatively impacting photosynthesis, or increasing the reflection of IR radiation back to the Earth's surface.

SUMMARY

The present invention includes a method of lowering the temperature of the Earth. The method comprises placing particles of sand into the upper atmosphere, wherein the particles are selected on the basis of size and refractive index such that the particles will scatter and reflect incoming sunlight having a wavelength in the near-IR back into space. In one aspect, the average diameter of the particles is between 1 μm and 2.5 μm. In another aspect, the average diameter of the particles is selected based on the index of refraction and the Mie scattering intensity for dielectric particles, to maximize the amount of light scattered at wavelengths between 0.8 μm and 2 μm. In yet two other aspects, the average diameter of the particles is selected based on the index of refraction and the Mie scattering intensity for dielectric particles, to minimize the amount of light scattered at wavelengths between 5 μm and 20 μm and/or to minimize the amount of light scattered at wavelengths near 0.662 and 0.430 μm.

DETAILED DESCRIPTION

Embodiments of the present invention are methods of selecting particles of sand and placing them into the upper atmosphere, where they will act to strongly scatter sunlight and reflect it back into space to reduce the amount sunlight that penetrates the atmosphere and warms the Earth. Particles of sand are predominately comprised of $SiO_2$, which is not a metal oxide; they do not readily exhibit the Welsbach effect, which is not necessary for the practice of the present invention.

Figure 1:
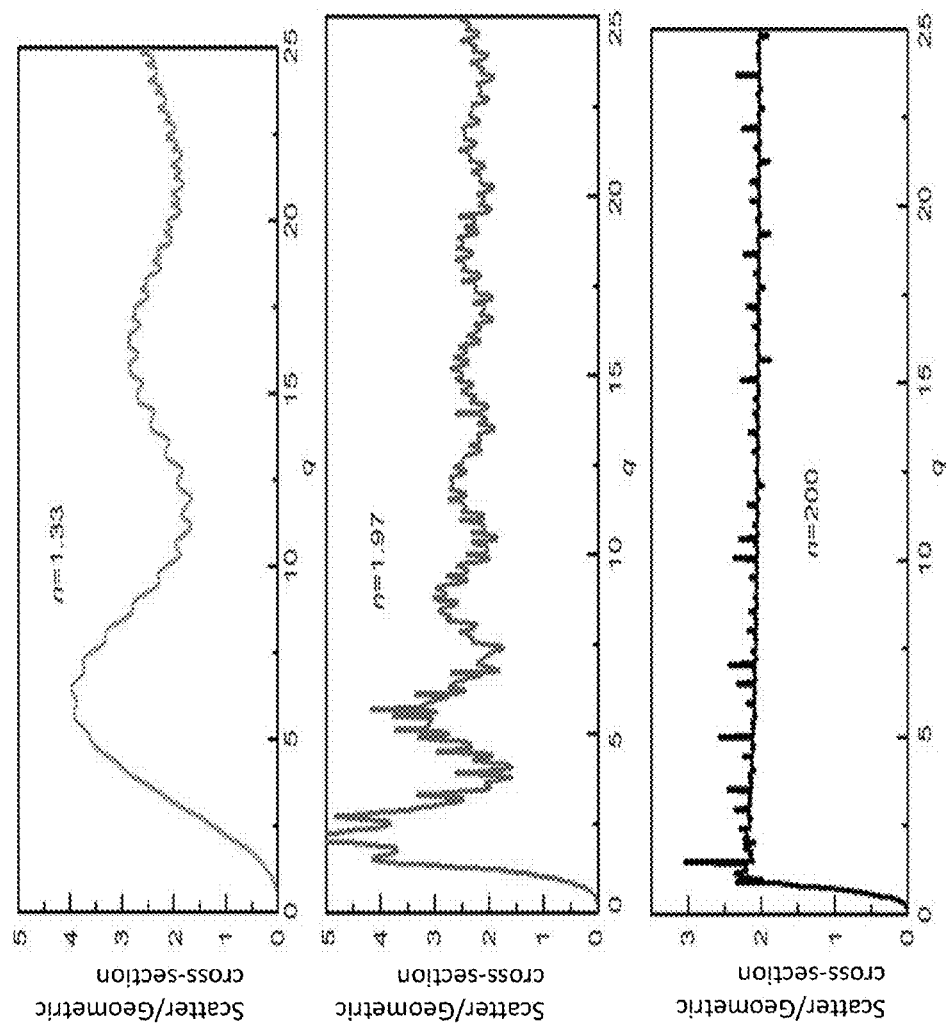
FIG. 1 is a set of Mie Scattering graphs for dielectric particles with different values of index of refraction (n).
Figure 2:
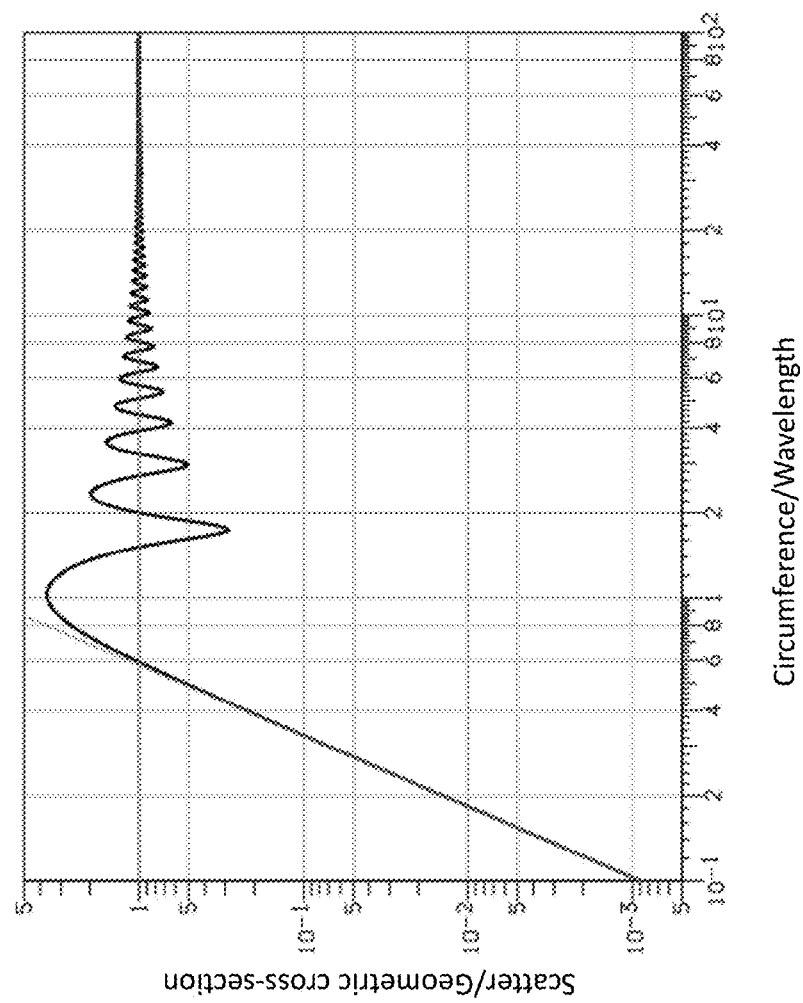
FIG. 2 is a Mie Scattering graph for metallic spheres.

FIGS. 1 and 2 illustrate Mie scattering, by dielectric and metallic particles respectively, where the vertical axes represent the dimensionless ratios of the cross-section for scattering light to the geometric cross section (($\pi/4$)*particle diameter squared) of the particles, and the horizontal axes represent the dimensionless ratios (q in FIG. 1) of particle circumference (or $\pi$*particle diameter) to wavelength.

Calculations for dielectric particles, such as those resulting in the curves of FIG. 1, show that the largest peak scattering cross-section occurs when $2*q*(n-1)=4$, where n is the index of refraction. For particles of sand ($SiO_2$) with an index of refraction (n) of 1.5, the largest peak in Mie scattering will therefore occur at a wavelength of ($\pi$*particle diameter)/4.

For one embodiment, the particle diameter is chosen to be in a narrow range around 1.6 μm, so that the wavelength for the maximum scattering of sunlight will be at 1.26 μm, and so that strong scattering will occur through the near infrared (ranging from 0.8 μm to 2 μm). Thus, when introduced into the upper atmosphere, sand particles with a diameter around 1.6 μm can strongly scatter sunlight in the near infrared wavelength band. It is well known that about 34% of the total amount of energy in sunlight is contained within this band. Sand particles will also scatter sunlight in the visible range, but less strongly. Combining the reflectance across all wavelengths of sunlight, a modest density of sand particles distributed in the upper atmosphere would easily reflect 30% or more of the total incident energy from the sun back into space.

Moreover, for particles providing a peak scattering intensity at a wavelength of 1.26 μm, the first minimum for scattering light will occur at 0.662 μm, which corresponds to the red light required for photosynthesis. The second minimum is at 0.430 μm, which corresponds to the blue light required for photosynthesis. According to Mie scattering calculations of the type used to produce the curves of FIG. 1, the maximum scattering cross section is about 2* the average scattering level for short wavelengths, and the magnitude of scattering at the first two minima is approximately 0.6 times and 0.8 times the short-wavelength average. Thus, when introduced into the upper atmosphere, sand particles with a diameter around 1.6 μm will not impact visible light in the two bands necessary for photosynthesis nearly as strongly as the smaller sulfate aerosol particles proposed by others.

Furthermore, with a particle diameter around 1.6 μm and index of refraction of 1.5, the scattering of the black body radiation around 10 μm that cools the Earth would be very weakly affected. Scattering at wavelengths much longer than the wavelength of the peak falls off as 4th power of the wavelengths—see the regions of the Mie scattering curves of FIGS. 1 and 2[1] to the left of the first scattering peak. Compared with the peak scattering intensity at 1.26 μm, the scattering intensity at 5 μm would be about 50 times smaller, at 10 μm it would be about 1000 times smaller, and at 20 μm it would be about 1 million times smaller. Even with particles as large as 3 μm, used in some other embodiments of this invention, the scattering intensity at 5 μm would be about 10 times lower than the scattering intensity at the peak, and at 10 μm would be about 80 times lower than at that peak.

[1] Although FIG. 2 concerns Mie scattering by metal spheres, the same fall off from the peak applies for scattering by dielectric particles as for metallic ones.

In the present invention, the portion of the spectrum of sunlight that will be reflected by these sand particles is adjusted by carefully selecting their composition (which determines their index of refraction), and their diameter. By an appropriate selection of these parameters, the presence of these particles in the upper atmosphere will reduce global warming by strongly scattering the part of the sunlight that lies in the near infrared. Depending on the density of particles that are placed in the upper atmosphere, 30% or more of the total incoming sunlight can in theory be reflected back into space before it can be absorbed by the ground and heat the earth.

At the same time, by carefully choosing their diameter and index of refraction so that the peak light scattering occurs near 1.26 μm, these particles are also tuned to minimize reflecting away the sunlight required by plants. Finally, again by carefully choosing the size and index of refraction of the particles so that the peak light scattering occurs near 1.26 μm, the black body radiation removing heat from the earth is not reflected back towards the Earth's surface but can escape into space.

It should be noted that throughout this disclosure "strong" or "strongly" in the context of light scattering is defined to mean that the light scattering cross-section of the particle (or particles) concerned is greater than the 2* the geometric cross-section of that particle (or those particles).

Figure 3:
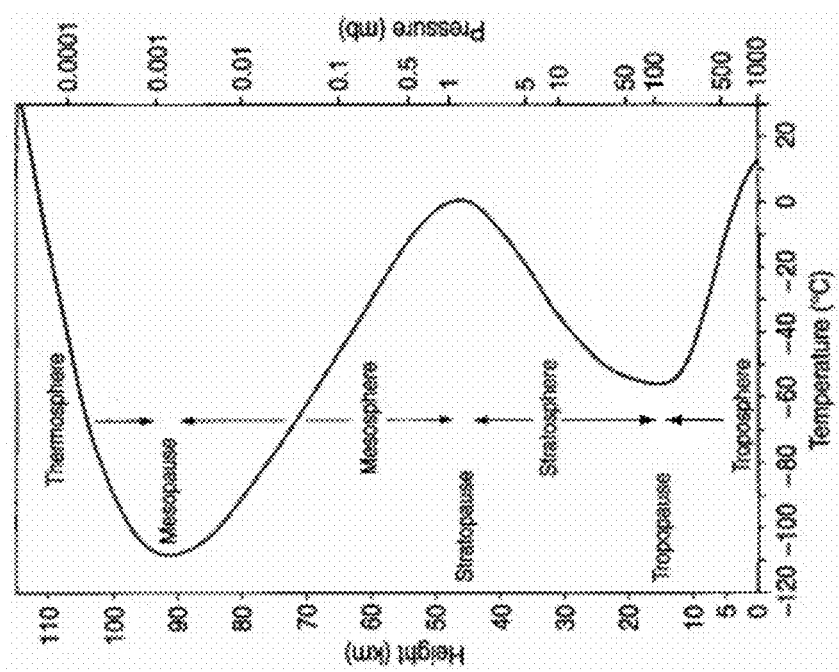
FIG. 3 shows the relationships between atmospheric temperature, atmospheric pressure and altitude above the Earth.

FIG. 3 illustrates the relationships between atmospheric temperature, atmospheric pressure and altitude above the Earth. It shows an altitude of about 15,000 m (typical for mid-latitudes) for the upper end of the lower atmosphere, the troposphere, and the lower end of the upper atmosphere, or the stratosphere. It also shows the air temperature decreasing with altitude in the lower atmosphere, or troposphere, and increasing with altitude in stratosphere, or upper atmosphere.

In one embodiment, sand is gathered, screened to obtain a narrow distribution of particle diameters, transported up to the upper atmosphere, and released as un-agglomerated, fine dust into the air. "Sand" is a common term used to identify naturally occurring deposits of particles with a size range that is from approximately 0.1 μm to approximately 3000 μm. Deposits of particles that are much smaller tend to be defined as clay. Deposits of particles that are much larger tend to be defined as gravel. "Sand" particles are often thought of as consisting of mostly SiO2. For many naturally occurring deposits of sand, this is true. However, in some locations, many elements and minerals are in the sand. The defining factor for "sand" is the range of particle sizes.

In one embodiment, the type of sand gathered is "old" sand, taken from one of the major deserts of the world like the Sahara Desert. "Old" sand tends to be free of clay and salt particles. "Old" sand has been blowing around in the desert for centuries. The particles tend to be round and smooth, rather than irregular with sharp corners or edges. Round sand has the advantages of having a more uniform cross-section for scattering light, being less harmful to humans and animals, if any becomes airborne during the transport process, and being less likely to agglomerate during transport and deployment.

Often, "old" sand from the major deserts is not composed of pure silicon dioxide (SiO2), but may contain some iron and iron oxide in addition. The presence of iron compounds will probably change the index of refraction a little, and therefore, also change the preferred size of the particles so that the peak of the light scattering remains near 1.26 μm. For example, the refractive index of iron oxide is higher than SiO2. Therefore, the average particle diameter may need to be a little smaller to keep the wavelength of peak scattering at the desired value. Also, if there is a wide range of the amount of iron, then there will be a wider range for the effective light scattering cross-sections. Finally, the presence of iron in the sand could be a major benefit. Iron is known to fertilize ocean waters and encourage the growth of plankton and algae. These additional photosynthetic organisms sequester some additional carbon dioxide, which could help cool the earth.

In one embodiment of the present invention, sand is gathered and screened to select particles of a specific size. Particles are first screened with a mesh that allows only particles below a set diameter to fall through the screen. Then, the sand is additionally screened and/or centrifuged to segment the particles by size so that the desired particles sizes can be selected. Screening is a standard process that is used for sand and gravel. Centrifuging is also a standard process used to separate heavier from lighter materials. With several stages of screening and centrifuging, first the particles that are too large are removed. Then, the particles that are too small are removed. Particles in the desired range of sizes remain. This is just one method by which sand can be processed to select particles of a desired average diameter and to control the distribution of diameters. There are many other well known particle sorting and selecting techniques that can be used to implement this invention.

In one embodiment, the particles are mostly comprised of SiO2 with an index of refraction (n) of 1.5, and the center of the distribution of particle diameters (aka the average particle diameter) is chosen to be 1.6 μm. With an average diameter of 1.6 μm and a refractive index (n) of 1.5, the peak intensity of light scattering will occur at a wavelength of approximately 1.26 μm. In other embodiments, depending on the exact composition of the sand and the desired scattering peak, the center of the distribution (or average particle diameter) may be chosen anywhere from approximately 1 μm to 2.5 μm. In still other embodiments, the distribution may be much wider to lower the cost of the screening process. The average particle diameter may be in the range from 0.5 μm to 5 μm.

It may be beneficial, but not essential, that the distribution be kept very tight, with a clear tradeoff existing between ultimate performance and cost and/or time to provide the selected distribution. In one embodiment, the distribution of particle diameters would be within +−10% of the average. With an accurate average particle diameter and a tight distribution, the amount of sunlight attenuation in the near infrared (0.8 μm to 2 μm wavelength) can be maximized. At the same time, the amount of sunlight attenuation at the red and blue wavelengths required for photosynthesis (0.662 μm and 0.430 μm) can be minimized.

In some embodiments, the center of the distribution, or the average particle diameter (d) may be less than or greater than 1.6 μm, or the sand particles may have a wide variation in composition, or the distribution of particle diameters may be wide. For these cases, the light scattering cross-section at the red and blue wavelengths used by plants will approach 2 times the geometric cross section, where the geometric cross section is $(1/4)*(\pi d^2)$. However, even for these embodiments, with an index of 1.5 and an average particle diameter of 1.6 μm, the light scattering cross-section in the near IR band (0.8 μm-2 μm) is still more than 4 times the geometric cross-section. Hence, the amount of light reflected at the near IR wavelengths is twice as great as the amount of light reflected at the red and blue wavelengths of light used by plants.

The total amount of sand particles required for a 16% reduction in sunlight energy is modest. (A 16% reduction is simply used as an example; such a large reduction may not be necessary). To calculate a rough estimate, consider that the geometric cross-section of each particle is $2*10^-12$ m2 and the light scattering cross-section of each particle is approximately $8*10^-12$ m2 at 1.26 um and averages $4*10^-12$ m2 for wavelengths shorter than 0.8 μm. Therefore, looking down through 1 sq m of the upper atmosphere, $1.25*10^11$ particles per m2 of surface area would reflect approximately 63% of the incident near IR energy. It will also reflect about 40% of the sunlight at wavelengths shorter than 0.8 μm. Combining these two effects, about 50% of the sunlight would be reflected. Therefore, to achieve a 16% reduction in the total sunlight energy, roughly $4*10^10$ particles per m2 would be required. Please note that a 16% change in the amount of sunlight reaching the earth is a huge change and likely to be much more than necessary.

The total mass of particles is calculated according to the formula:

Total Mass=(areal density of particles)*(Surface area of Earth)*(density of SiO2)*(volume of each particle)

Total Mass≈$4*10^10$/m2*3.14*(13,000,000)^2m2*2.5 mtons/m3*0.5*(1.6*10-6)^3m3

≈110 million mtons (metric tons) of sand particles

Fine particles of sand will remain in the upper atmosphere for about 2 years. This has been observed after explosive volcanic eruptions like Krakatoa. In theory, the sand particles could be placed in the upper atmosphere exactly above the equator and 50% of them would be carried north and 50% would be carried south by the upper atmosphere air currents. A more reliable practice is to place the sand particles slightly to the north and slightly to the south of the equator. The upper air currents tend to flow from the north side of the equator and south from the south side. They do not tend to cross the equator. In one embodiment of the present invention, the fine particles of sand are introduced into the upper atmosphere at each of two locations, one 0-3000 km north of the equator, and the other 0-3000 km south of the equator. If the particles are introduced too far to the north or south of the equator, then they may not flow back toward the equator enough to reflect sunlight over the equator. In another embodiment, they are introduced 500 km north and 500 km south of the equator. Again, based on observations after explosive volcanic eruptions, the particles will distribute themselves laterally around the globe within several months and longitudinally toward the poles over a few years. The upper atmosphere has air currents that will quickly distribute the fine sand particles along the earth's parallels, (in the east-west direction) and more slowly along the medians, from the equator to the poles.

From their time of introduction in the upper atmosphere, the fine sand particles will remain above the Earth's surface for about 2 years. This was also observed after major volcanic eruptions. Therefore, each year, we will need to replace 55 million mtons of particles (about ½ of the total). There is little communication between the upper and lower atmosphere. Particles placed into the upper atmosphere are held aloft by air currents. They do not tend to fall down into the lower atmosphere. Instead, the particles come down either inside of rain drops during intense thunderstorms (where the clouds reach into the upper atmosphere) or in the polar vortex and the storms it creates at either pole, where the particles will mostly come down inside of snowflakes.

Gathering the sand would be a routine process. In places like the Sahara Desert, the sand would be loaded into dump trucks and transported to a nearby location where it could be screened. In one embodiment, the sand would first be screened with increasingly fine mesh screens that will remove all particles with diameters greater than about 5 μm. Then, the remaining particles would be further screened and/or centrifuged one or more times to remove all particles greater than the maximum diameter desired. Finally, the remaining particles would be centrifuged one or more times to remove the particles with diameters below the minimum desired diameter. For particles with an average diameter between 0.5 and 5 μm, a series of screening and/or centrifuge steps is a cost effective process. A variety of standard techniques are available to implement this process.

The processed sand with the desired average particle size and with the desired distribution of particles sizes would be transported (by rail, by truck, by sea, and/or by air) to an airstrip near the equator. The percentage of gathered sand that will pass the screening and meet the goal of a tight distribution is difficult to estimate. It will depend on the exact location from which the sand is taken, the desired distribution (+−10%, +−20%, etc), and the cost of screening for tighter distributions. To minimize ground transportation costs, the distance from the gathering location to the screening location should be short.

There are a number of methods by which to transport the distribution of fine sand particles to the upper atmosphere. In one embodiment, the screened sand is flown to the upper atmosphere in planes. An empty Boeing 737 airplane can carry a load of 25 mtons. Such a plane would have to be adapted to reach and briefly operate at an altitude of 18,000 m (60,000 feet) or higher. The altitude that forms the boundary between the bottom of the upper atmosphere and the top of the lower atmosphere is illustrated in FIG. 3. In the lower atmosphere, the air temperature falls with increasing altitude. In the upper atmosphere, the air temperature rises with increasing altitude. The boundary between the two is defined as the altitude at which the temp stops falling and begins rising. This is also shown in FIG. 3. This altitude varies with latitude. At the equator, this boundary occurs at an altitude of about 17,000 m. At mid-latitudes it is lower. At the poles, it is much lower, often under 10,000 m. The altitude of the boundary also varies with the seasons and other factors. It is important to deliver the fine sand particles at least as high as the bottom of the upper atmosphere so that the upper atmosphere air currents can distribute the particles throughout the upper atmosphere and so that very few sand particles are accidentally introduced into the lower atmosphere. In one embodiment, the particles are placed 1000 m or more above the altitude at which the air temperature begins to rise with increasing altitude. This will assure that the particles are placed reliably into the upper atmosphere. When introduced at or above the bottom of the upper atmosphere, the particles will spread out. The air currents in the upper atmosphere will carry them upwards into the lower 10,000-20,000 m of the upper atmosphere, around the planet and eventually, toward the two poles.

Delivering 55 million mtons per year would require 2,200,000 flights, or 630 planes flying 10 flights per day, 350 days per year. The planes would take off near the equator, quickly climb to 18,000 m, release the fine sand particles into a fast air stream to assure break up any possible clumps, then descend, land, refuel and reload. This is quite doable. 10 flights a day would require about 15-20 hours per day.

At a charter cost of $5000 per hour and a total time per load of 1.5 hours, the cost per mton would be $300. Gathering the sand, screening the sand, transporting the sand to an airstrip, and flying the sand into the upper atmosphere should cost less than $500 per mton. This would be a total cost of less than $30 billion per year. To combat the effects of a several trillion dollar per year fossil fuel industry, this would be a small amount of money, about 1% of annual revenues.

In addition to aircraft, in other embodiments, hydrogen or helium balloons, long flexible pipes held aloft by blimps, Thoth towers or other more exotic means may be used to deliver the fine sand particles to the upper atmosphere.

Sand particles with diameters below 2.5 μm are known to cause damage to the lungs when inhaled. Around the world, safe limits for airborne particles with diameters below 2.5 μm have been set. The limits vary from 8-35 μg/m3. In embodiments of the present invention, the maximum concentration of sand particles (with 1.6 μm average diameter) in the upper atmosphere (after being distributed by air currents over a range of altitudes from 20,000 to 30,000 m above the Earth) is around $4 \times 10^6$ particles per m3, which corresponds to a mass density of 20 μg/m3. This is close to or in some cases exceeds the health safety limits set by various countries, but of course no practical risk is posed as long as the particles remain in the upper atmosphere. Only if substantially all of these particles in the upper atmosphere were to fall into lower altitudes (for example from 0 to 10,000 m) in an airborne state would their resulting mass density of 20 μg/m3 violate some of the health safety limits noted above and be of concern.

Fortunately, there is little communication between the upper and lower atmosphere. Once in the upper atmosphere, the particles will stay there for a long time. There are essentially two routes or processes by which they eventually fall towards the Earth's surface. In one, they would be brought down to Earth inside the raindrops of the most powerful thunderstorms, whose cloud tops reach into the upper atmosphere. Alternatively, they may be brought down inside of snowflakes in the storms created by the polar vortex near either of the poles. In both cases, they arrive in the lower atmosphere safely encapsulated within rain drops or snowflakes, and fall harmlessly to the ground, rather than being breathed into the lungs of people or animals.

Embodiments described herein provide various benefits. In particular, embodiments may result in a significant reduction in global warming by introducing into the upper atmosphere particles selected (in composition, size, and size distribution) to provide high levels of reflection of near IR energy from the sun back into space, transmission of visible wavelengths in the red and blue bands necessary for photosynthesis through to the Earth's surface, and transmission of far IR energy produced at the Earth's surface out into space. Some embodiments use particles selected to avoid the risk of acid rain. Some embodiments use particles sourced in part according to their shape, such that health risks and tendency to agglomerate during gathering and transportation and deployment are minimized.

Although the present invention has been described with respect to embodiments thereof, these particular embodiments are merely illustrative, and not restrictive. It will also be appreciated that one or more of the elements depicted in the drawings/figures can also be implemented in a more separated or integrated manner, or even removed or rendered as inoperable in certain cases, as is useful in accordance with a particular application. Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method of lowering the temperature of the Earth, the method comprising:
   gathering, from one or more naturally occurring deposits, particles of sand comprising $SiO_2$ and other minerals;
   selecting from the gathered sand particles, without performing any chemical processing, a sub-set of sand particles, wherein the selection is based solely on
   size and refractive index such that
   the light scattering cross-section of the sand particles for wavelengths between 0.8 μm and 2.5 μm is greater than 2× the geometric cross-section of the sand particles; and
   placing the selected sub-set of sand particles into the upper atmosphere.

2. The method of claim 1, where the diameter of the particles is within +/−10% of 1.6 μm.

3. The method of claim 1, where the average diameter of the particles is selected based on the index of refraction and the Mie scattering intensity for dielectric particles, to maximize the amount of light scattered at wavelengths between 0.8 μm and 2 μm.

4. The method of claim 1, where the average diameter of the particles is selected based on the index of refraction and the Mie scattering intensity for dielectric particles, to minimize the amount of light scattered at wavelengths between 5 μm and 20 μm.

5. The method of claim 1, where the average diameter of the particles is selected based on the index of refraction and the Mie scattering intensity for dielectric particles, to minimize the amount of light scattered at or near the wavelengths of 0.662 μm and 0.430 μm.

6. The method of claim 1, where the particles are mostly composed of $SiO2$ having an index of refraction of 1.5.

7. The method of claim 6, where the average diameter of the particles is selected to be 1.6 μm.

8. The method of claim 1, where the particles are sand particles gathered from a desert.

9. The method of claim 1, where the placement of the particles comprises transporting the particles into the upper atmosphere and releasing them at a first location within 3000 km to the north of the equator and at a second location within 3000 km to the south of the equator.

10. The method of claim 1, where the placement of the particles comprises transporting the particles to a location above the lower edge of the upper atmosphere using a commercial airplane adapted to reach and operate at an altitude of 18,000 m or higher.

11. The method of claim 1, where the placement of the particles comprises transporting the particles to a location above the lower edge of the upper atmosphere using hydrogen or helium filled balloons.

12. The method of claim 1, where the selection of particles comprises screening using fine mesh screens and/or centrifuges to retain only particles that fall within a desired range of diameters.

* * * * *